United States Patent
Barnes

[19]

[11] Patent Number: 6,089,819
[45] Date of Patent: Jul. 18, 2000

[54] METHOD AND APPARATUS FOR PALLETIZING AND DEPALLETIZING LAYERS OF ARTICLES ON STACKABLE PALLETS

[75] Inventor: Timothy A. Barnes, Burlington, Ky.

[73] Assignee: HK Systems, Inc., New Berlin, Wis.

[21] Appl. No.: 08/912,730

[22] Filed: Aug. 18, 1997

[51] Int. Cl.⁷ ................................................. B65G 57/24
[52] U.S. Cl. ................................... 414/794.7; 414/791.6; 414/796.2; 414/796.8; 414/796.9; 414/801; 414/802; 414/922; 414/929; 414/933
[58] Field of Search ............................ 414/794.7, 791.6, 414/796.2, 796.8, 796.9, 929, 922, 933, 907, 801, 802

[56] References Cited

U.S. PATENT DOCUMENTS

| | | | |
|---|---|---|---|
| 2,768,756 | 10/1956 | Horman | 414/794.7 |
| 3,487,959 | 1/1970 | Pearne et al. | 414/796.9 |
| 4,058,225 | 11/1977 | Janson | 414/796.8 |
| 4,172,686 | 10/1979 | Shorthouse | 414/114 |
| 4,205,934 | 6/1980 | Pantin et al. | 414/796.9 |
| 4,593,517 | 6/1986 | Mattila et al. | 53/441 |
| 4,708,564 | 11/1987 | Mylrea et al. | 414/36 |
| 4,815,924 | 3/1989 | Jaatinen | 414/794.7 |
| 4,978,275 | 12/1990 | Reid et al. | 414/794.7 |
| 4,993,915 | 2/1991 | Berger et al. | 414/929 |
| 5,015,140 | 5/1991 | Kling | 414/282 |
| 5,066,190 | 11/1991 | D'Agnolo | 414/799 |
| 5,096,367 | 3/1992 | Winski | 414/929 |
| 5,096,369 | 3/1992 | Ouellette | 414/929 |
| 5,123,231 | 6/1992 | Fallas et al. | 53/493 |
| 5,207,727 | 5/1993 | Pearce et al. | 414/792.7 |
| 5,271,709 | 12/1993 | VanderMeer et al. | 414/794.7 |
| 5,397,211 | 3/1995 | Lloyd et al. | 414/663 |
| 5,405,232 | 4/1995 | Lloyd et al. | 414/280 |
| 5,733,100 | 3/1998 | Slat et al. | 414/794.7 |

FOREIGN PATENT DOCUMENTS

| | | | |
|---|---|---|---|
| 2145227 | 9/1971 | Germany | 414/796.9 |

*Primary Examiner*—Douglas Hess
*Attorney, Agent, or Firm*—Nilles & Nilles, S.C.

[57] ABSTRACT

A palletizer/depalletizer system includes a palletizer assembly and depalletizer assembly stacked one beneath the other on a common frame assembly. Both assemblies are adapted to handle layers of articles and stacks of pallets. The palletizer loads articles on stacks of empty pallets by transferring layers of articles one at a time onto the uppermost pallet until the pallet is fully loaded, conveying the loaded pallet away from the system using a conventional automated storage and retrieval (ASR) machine, and then loading the next pallet on the stack. The depalletizer creates stacks of empty pallets by repeatedly unloading layers of articles from a pallet to empty the pallet and then accepting a loaded pallet on top of the recently-emptied pallet. The palletizer and the depalletizer each include a separate article transfer assembly preferably taking the form of a pair of independently-operated sweep arms which act in conjunction with one another to transfer articles horizontally in a staging plane between 1) a hoisting zone in which is vertically movable a hoist supporting the pallets and 2) a staging area in which is disposed a staging conveyor which conveys articles to or from the system. A stackable pallet suitable for use in a palletizer/depalletizer system of this type and for handling by a conventional SRM without shifting either laterally or longitudinally also is provided.

18 Claims, 10 Drawing Sheets

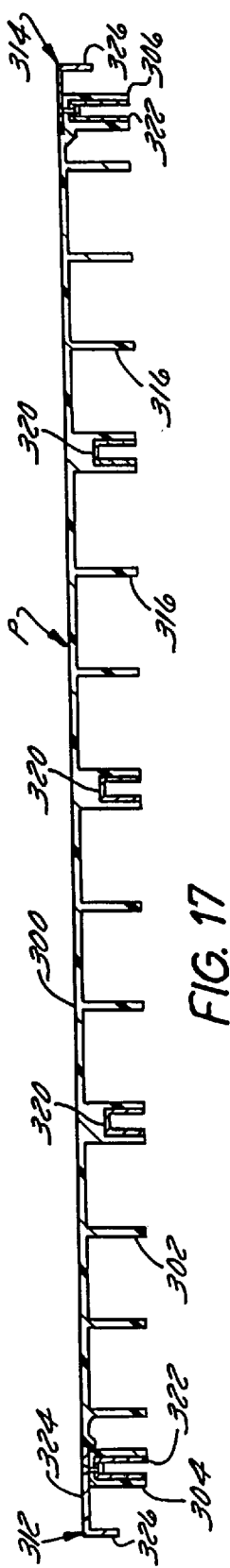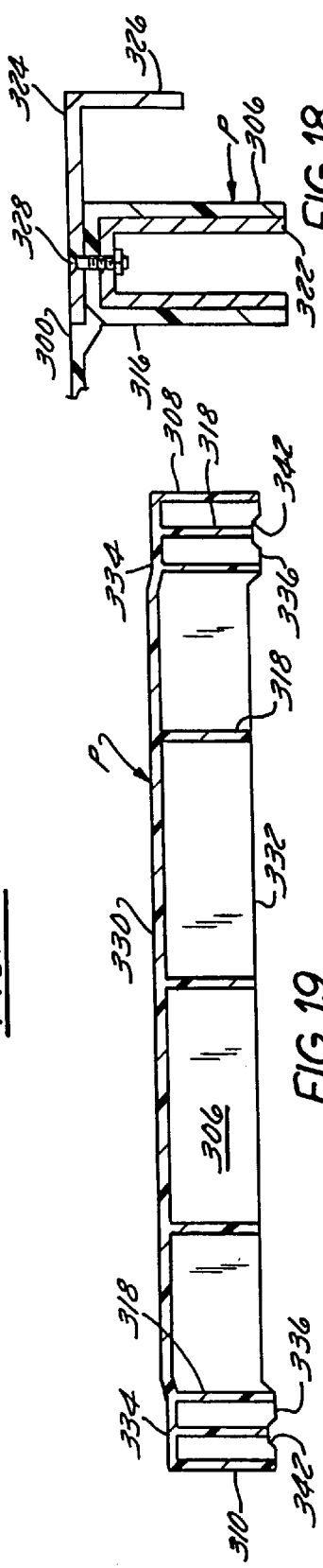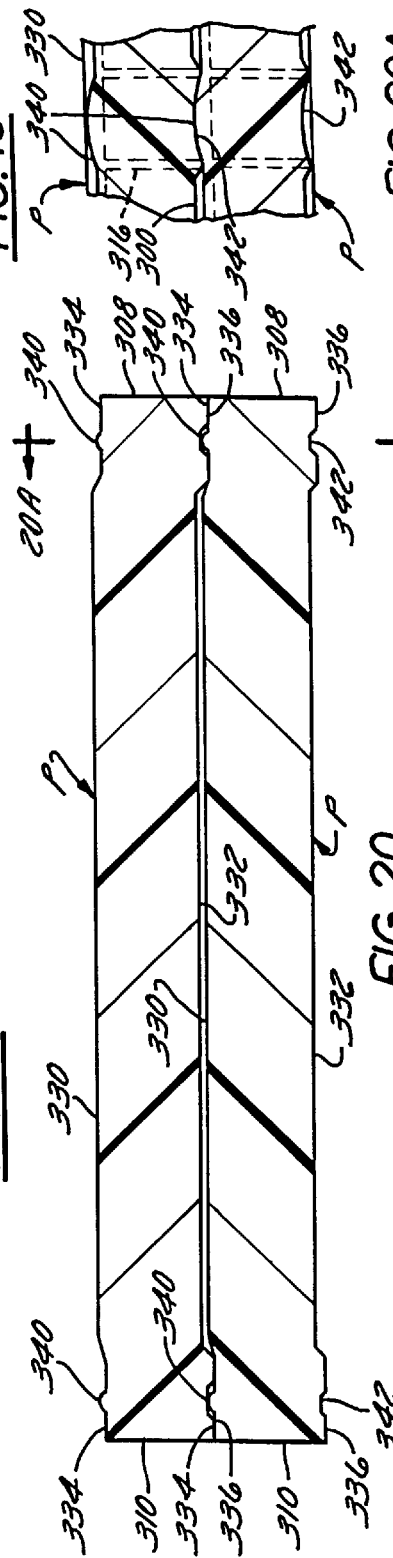

METHOD AND APPARATUS FOR PALLETIZING AND DEPALLETIZING LAYERS OF ARTICLES ON STACKABLE PALLETS

BACKGROUND OF THE INVENTION

1. Field of the Invention

The invention relates to article handling systems and, more particularly, relates to a method and apparatus for palletizing and/or depalletizing layers of articles on or from stackable pallets and to a stackable pallet usable therewith.

2. Background of the Invention

Article handling systems are well known for stacking layers of articles on a pallet or for removing layers of articles from a loaded pallet. Article handling systems that stack layers of articles on a pallet to load the pallet generally are known as palletizers. Article handling systems that remove layers of articles from a pallet to unload the pallet generally are known as depalletizers. Some article handling systems are capable of operating either as a palletizer or as a depalletizer, using at least some common equipment of the system for both palletizing and depalletizing operations. A palletizer is disclosed, for example, in U.S. Pat. No. 4,708,564 to Malrea. A combined palletizer/depalletizer is disclosed in U.S. Pat. No. 5,207,727 to Pierce et al.

Palletizers, depalletizers, and combined palletizers/depalletizers typically are designed to stack and/or unstack as many as 30–40 boxes or other articles on and/or from a relatively large pallet. These systems therefore must be relatively large to accommodate fully-stacked pallets—so large in fact that they are not easily located in a storage and retrieval system central aisle for access by automated storage and retrieval machines (SRM's). Stacks of pallets instead are conveyed to and from the article handling system by dedicated conveyors—thereby further increasing the space requirements of the system.

Another problem associated with standard palletizers and/or depalletizers is that they are poorly suited for rapidly handling relatively small numbers of articles. As mentioned above, a fully-loaded pallet of the type typically used in palletizers and/or depalletizers supports 30–40 cartons or other articles or even more. Many businesses, such as the typical meat packing business, seldom ship or receive batches of more than 9–12 cartons or other articles. Palletizers and/or depalletizers used in these applications therefore must routinely handle partially-loaded pallets using an oversized system that operates at less than ⅓ to ½ of its capacity at a considerable waste of space and resources.

A conventional wooden pallet used in palletizers and/or depalletizers also cannot be loaded or unloaded if it is stacked on top of other pallets. Nor can they be handled by SRMs commonly used to handle trays or pans. Typical prior art systems therefore require that pallets be delivered to and from a staging area one at a time. This requirement adds additional complexity and expense to a palletizing operation or a depalletizing operation.

OBJECTS AND SUMMARY OF THE INVENTION

A first principal object of the invention therefore is to provide an improved method of palletizing layers of articles using less effort and space than are required for traditional palletizing processes.

Another object of the invention is to provide a method that meets the first principal object and that is well-suited for applications in which fully-loaded pallets support fewer articles than are stacked on traditional fully-loaded pallets (typically 9–12 articles as opposed to 30–40 articles on traditional pallets).

Still another object of the invention is to provide a method of palletizing articles that meets at least the first principal object of the invention and that it is capable of stacking articles on the uppermost pallet of a stack of pallets and of removing a loaded pallet from a stack of pallets.

In accordance with a first aspect of the invention, this object is achieved by providing a method including the steps of raising a hoist within a palletizing zone to lift a stack of pallets to a position in which an upper surface of an uppermost pallet of the stack is positioned in a staging plane, wherein the uppermost pallet comprises an nth pallet of the stack and is supported on an (n−1)th pallet of the stack, and wherein n is greater than one, and then depositing a layer of articles on the nth pallet. Subsequent steps include lowering the hoist to a position in which an upper surface of the layer is positioned in the staging plane, then depositing another layer of articles on the layer, and then repeating the lowering and depositing steps until the nth pallet is fully loaded with layers of articles. The nth pallet then is removed from the stack so that the (n−1)th pallet becomes the uppermost pallet of the stack, and the hoist is raised to a position in which an upper surface of the (n−1)th pallet is positioned essentially in the staging plane. A layer of articles then can be deposited on the (n−1)th pallet.

The palletizing process can be repeated for each of the remaining pallets of the stack so that no pallets are supported on the hoist, and another stack of n pallets can then be transported to the hoist.

Article transfer preferably is effected by driving a first sweep arm horizontally across a staging area in contact with one end of the layer from an initial position located remote from a palletizing zone to a terminal position located adjacent to the palletizing zone while simultaneously guiding movement of an opposite end of the layer using a second sweep arm which moves simultaneously with the first sweep arm from an initial position located adjacent to the staging area to a terminal position located remote from the staging area.

A second principal object of the invention is to provide an improved method of depalletizing or unloading stacked articles from a pallet that exhibits one or more of the beneficial characteristics discussed above.

In accordance with another aspect of the invention, this object is achieved by placing a pallet on a hoist having m layers of articles stacked therein (m being greater than 2) and then raising the hoist within a depalletizing zone to a position in which an upper surface of an (m−1)th layer of articles is positioned essentially in a staging plane and a bottom surface of an mth layer of articles, stacked on top of the (m−1)th layer, is positioned essentially in the staging plane, wherein the (m−1)th layer is supported on an underlying (m−2)th layer of articles. Subsequent steps include removing the mth layer from the stack, then raising the hoist to a position in which an upper surface of the (m−2)th layer and a bottom surface of the (m−1)th layer are positioned essentially in the staging plane, then removing the (m−1)th layer from the (m−2)th layer, and then repeating the raising and removing steps (C) and (D) until a first layer of articles is removed from the pallet to produce an empty pallet.

The depalletizing process may be repeated a number (n−2) of times to produce a stack of n empty pallets on the hoist (n being an integer greater than 2), and the stack of n pallets can then be removed from the hoist.

A third principal object of the invention is to provide an improved article handling system for palletizing and/or depalletizing articles from pallets.

Another object of the invention is to provide an article handling system that meets the third principal object and that does not require dedicated conveyors for conveying stacks of pallets to or from the system.

In accordance with still another aspect of the invention, these object are achieved by providing an article handling system comprising an article conveyor at least a portion of which is located in a staging area and has a conveying surface located essentially in a staging plane, a hoist moveable vertically in a hoisting zone located adjacent the staging area, and an article transfer assembly located over the article conveyor and the hoist and operable to push articles within the staging plane from one of the article conveyor and the hoist to the other of the article conveyor and the hoist.

The article transfer assembly preferably comprises a frame located above the article conveyor and the hoist and first and second independently movable sweep arms mounted on the frame. The sweep arms are driven by first and second independently operable drive mechanisms, with the first and second sweep arms extending parallel with one another and orthogonally to a direction of drive mechanism movement.

In order to permit both palletizing and depalletizing in a small area, a second article handling system may be mounted above the first article handling system. The second article handling system comprises a second staging conveyor located in a second staging area, a second hoist moveable vertically in a second hoisting zone located adjacent a second staging area, and a second article transfer assembly located over the second article conveyor and the second hoist and operable to push articles within the second article transfer plane from one of the second article conveyor and the second hoist to the other of the second article conveyor and the second hoist.

A fourth principal object of the invention is to provide a stackable pallet capable of storing and transporting relatively small numbers (on the order of 9–12) of articles.

Yet another object of the invention is to provide a pallet that meets the fourth principal object and that can be slid from the top of a stack of pallets by a conventional storage and retrieval machine, without being lifted from the stack, even when it is fully loaded.

Still another object of the invention is to provide a pallet that meets the fourth principal object and that can be moved while stacked without the pallets of the stack shifting either laterally or longitudinally.

In accordance with still another object of the invention, these objects are achieved by providing a pallet comprising an upper surface for supporting articles, a lower surface for resting on a support, front end, rear end, left side, and right side surfaces, and a handle which extends forwardly from the front side surfaces for access by a storage and retrieval machine. The upper and lower surfaces have complimentary vertically-projecting location surfaces therein to permit pallet stacking while inhibiting lateral movement of stacked pallets relative to one another.

In order to inhibit relative lateral movement of stacked pallets and to minimize sliding friction during pallet stacking and unstacking, the location surfaces preferably include a ridged portion extending upwardly from the upper surface, the ridged portion being positioned in a generally laterally central portion of the upper surface and extending longitudinally between the front end surface and the rear end surface, and a recessed portion extending upwardly into the lower surface at a location vertically beneath the ridged portion, the recessed portion having generally the same dimensions as the ridged portion, being positioned in a generally laterally central portion of the lower surface, and extending longitudinally between the front end surface and the rear end surface.

In order to inhibit undesired relative longitudinal movement of stacked pallets, the location surfaces preferably comprise a pair of laterally-spaced lugs projecting upwardly from the upper surface at locations spaced laterally beyond the ridged portion and terminating at a location which is no higher than the height of the ridged portion, and a pair of laterally spaced lug-receiving sockets formed in the lower surface vertically beneath the lugs.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout and, in which:

FIG. 17 is a sectional view taken generally along the lines 17—17 in FIG. 15;

FIG. 18 is an enlarged fragmentary view corresponding to the front end portion of FIG. 17;

FIG. 19 is a sectional view taken generally along the lines 19—19 in FIG. 15;

FIG. 20 is a sectional view generally corresponding to a view taken along the lines 20—20 in FIG. 15 and taken through two pallets stacked one on top of the other;

FIG. 20A is a sectional view taken along the lines 20A—20A in FIG. 20;

DETAILED DESCRIPTION OF THE PREFERRED EMBODIMENTS

1. Resume

Pursuant to the invention, a palletizer/depalletizer system is provided that includes a palletizer assembly and depalletizer assembly stacked one beneath the other on a common frame assembly. Both assemblies are adapted to handle layers of articles and stacks of pallets. The palletizer loads articles on stacks of empty pallets by transferring layers of articles one at a time onto the uppermost pallet until the pallet is fully loaded, conveying the loaded pallet away from the system using a conventional automated storage and retrieval machine (SRM), and then loads the next pallet on the stack. The depalletizer creates stacks of empty pallets by repeatedly unloading layers of articles from a pallet to empty the pallet and then accepts a loaded pallet on top of the recently-emptied pallet. The palletizer and the depalletizer each include a separate article transfer assembly preferably taking the form of a pair of independently-operated sweep arms which act in conjunction with one another to transfer articles horizontally in a staging plane between 1) a hoisting zone in which is vertically movable a hoist supporting the pallets and 2) a staging area in which is disposed a staging conveyor which conveys articles to or from the system. A stackable pallet suitable for use in a palletizer/depalletizer system of this type and for handling by a conventional SRM without shifting either laterally or longitudinally also is provided.

2. System Overview

Figure 1:
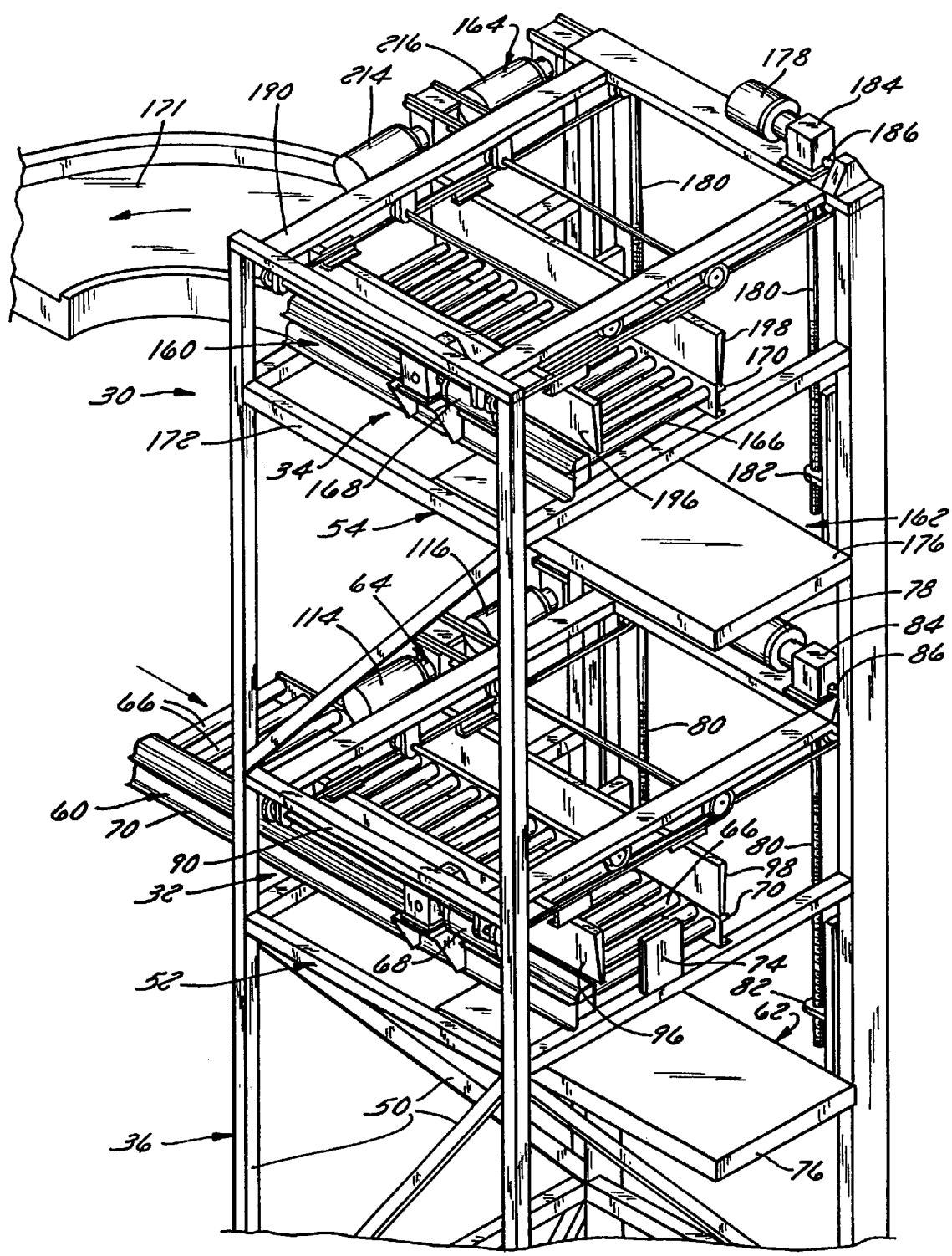
FIG. 1 is a perspective view of a palletizer/depalletizer system constructed in accordance with a preferred embodiment of the present invention.
Figure 2:
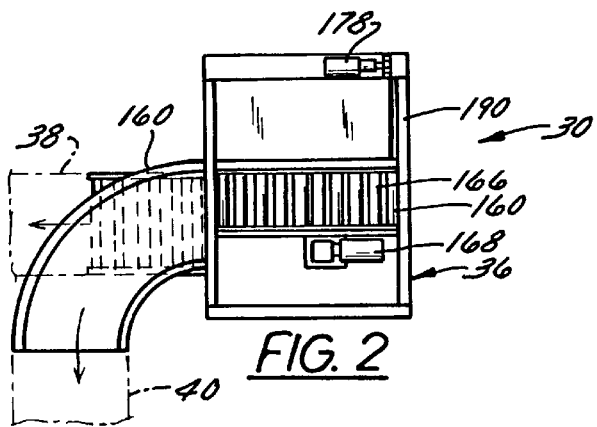
FIG. 2 is a top plan view of the palletizer/depalletizer system of FIG. 1.
Figure 3:
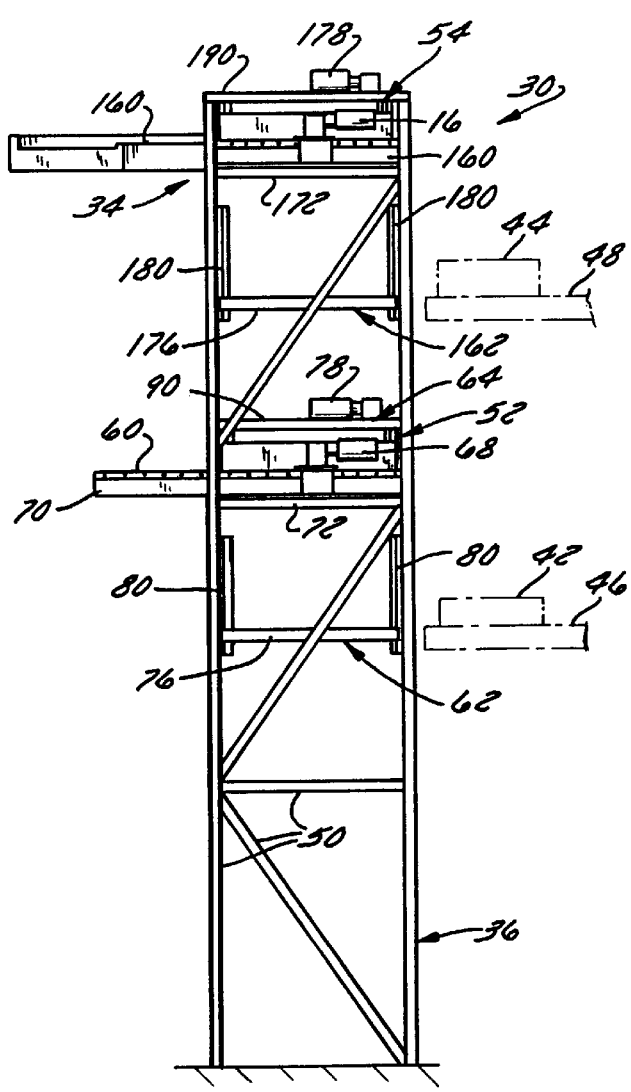
FIG. 3 is a side elevation view of the palletizer/depalletizer system of FIGS. 1 and 2.
Figure 4:
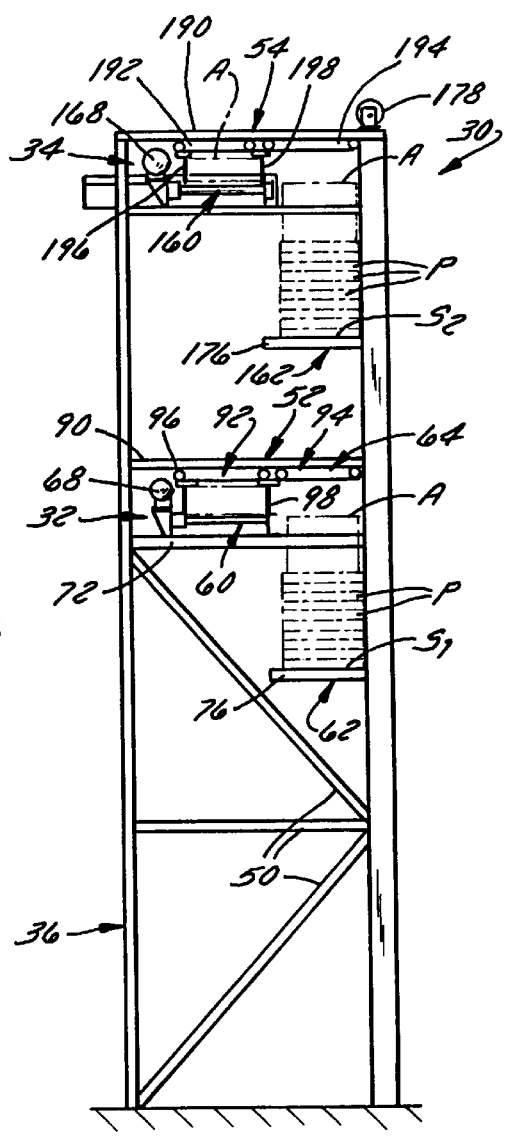
FIG. 4 is an end elevation view of the palletizer/depalletizer system of FIGS. 1–3.

Referring now to FIGS. 1–4 of the drawings, a palletizer/depalletizer system 30 is disclosed that includes a palletizer 32 and a depalletizer 34 stacked vertically one beneath the other on a common frame assembly 36. The system 30 preferably but not necessarily is configured for positioning in a central ASR aisle of an automated warehousing system so as to be accessible by a lower article supply conveyor 38 and an upper article takeoff conveyor 40 and by one or more pallet transport apparatus as seen in FIGS. 2 and 3. The supply conveyor 38 is adapted to convey articles either singly or in single-layer patterns to the palletizer 32, while the takeoff conveyor 40 is adapted to receive layers of articles from the depalletizer 34.

The pallet transport apparatus could comprise a forklift but, in the illustrated and preferred embodiment, comprises a pair of automated storage and retrieval (ASR) machines 42 and 44 which are associated with the palletizer 32 and the depalletizer 34, respectively. The SRM's 42 and 44 are positioned on suitable structures such as platforms 46 and 48 illustrated schematically in FIG. 3.

As is well known to those skilled in the art, an SRM is a portable article handling machine typically taking the form of an automated vehicle which moves along rails or another predefined path. The typical SRM includes a shuttle extendable between a transport position and loading/unloading position and may additionally include a vertically-reciprocating mast on which the shuttle is mounted. SRM's are disclosed, for example, in U.S. Pat. No. 5,015,140 to Kling and U.S. Pat. No. 5,405,232 to Lloyd et al., both of which hereby are incorporated by reference in their entirety for the disclosure of SRM's. For reasons that will become apparent below, the preferred SRM is one which is capable of pulling trays or pans from stacks without lifting them.

The frame assembly 36 comprises a plurality of interconnected metal struts 50 defining first and second platforms 52 and 54 located one beneath the other and supporting the palletizer 32 and the depalletizer 34, respectively. Components of the frame assembly 36 and of its integral platforms 52 and 54 that support individual components of the palletizer 32 and depalletizer 34 are discussed individually in Sections 3 and 4 below.

3. Construction and Operation of Palletizer

The palletizer 32 is adapted to receive layers of articles A from the supply conveyor 38 and to transfer the layers one at a time to a pallet P which may comprise the uppermost pallet of a stack $S_1$. When used with pallets of the type detailed in Section 5 below, the illustrated palletizer 32 can load the uppermost pallet of a stack of 10 pallets. The palletizer 32 is capable of loading an entire stack of pallets by loading each successive pallet P in the stack $S_1$ and permitting its removal.

The palletizer 32 includes an infeed conveyor 60 positioned in a staging area, an indexing hoist assembly 62 that extends through a hoisting or palletizing zone located adjacent the staging area, and an article transfer assembly 64 that transfers articles in a horizontal staging plane from the staging area to the palletizing zone. Each of these subassemblies will be described in turn.

The infeed conveyor 60 could be any conveyor capable 1) of transporting articles A into the staging area either singly or in patterns suitable for forming layers and of 2) retaining the articles in the staging area for an article transfer operation. The illustrated infeed conveyor 60 comprises a live roller conveyor having a plurality of powered rollers 66 which are driven to rotate by a suitable belt or chain drive (not shown) under power of a motor 68 to convey a pattern of articles either singly or as a group in the direction of the arrow in FIG. 1. The rollers 66 are rotatably supported on a pair of longitudinally-extending, laterally-spaced frames 70. The frames 70 are supported on coplanar L-supports of a lower portion 72 of the first platform 52. A stop 74 is positioned at the end of the conveyor 60 to prevent conveyed articles A from falling out of the staging area.

The indexing hoist assembly 62 comprises a rectangular hoist platform 76 and a lift mechanism which selectively raises and lowers the hoist platform 76 relative to the frame assembly 36. The lift mechanism preferably comprises a reversible electric motor 78 and a screw drive mechanism. As is conventional, the screw drive mechanism includes a plurality of threaded rods 80 on which the hoist platform 76 is mounted by a corresponding plurality of threaded supports or sleeves 82 (see FIGS. 6–9). The rods 80 are coupled to the motor 78 by a gear box 84 and drive shafts 86 mounted on the support frame assembly 36. The electric motor 78 transfers torque to the gear box 84, through the drive shafts 86, and to the threaded rods 80 to effect simultaneous rotation of all of the threaded rods 80 and corresponding vertical movement of the hoist platform 76 due to rotation between the threaded rods 80 and the threaded sleeves 82. The motor 78 can be controlled to precisely position the hoist platform 76 at any desired location within the palletizing zone. Motor control may be achieved using limit switches, optical sensors, encoders, and/or any other of a number of devices well known to those skilled in the art of designing indexing hoist assemblies.

Figure 5:
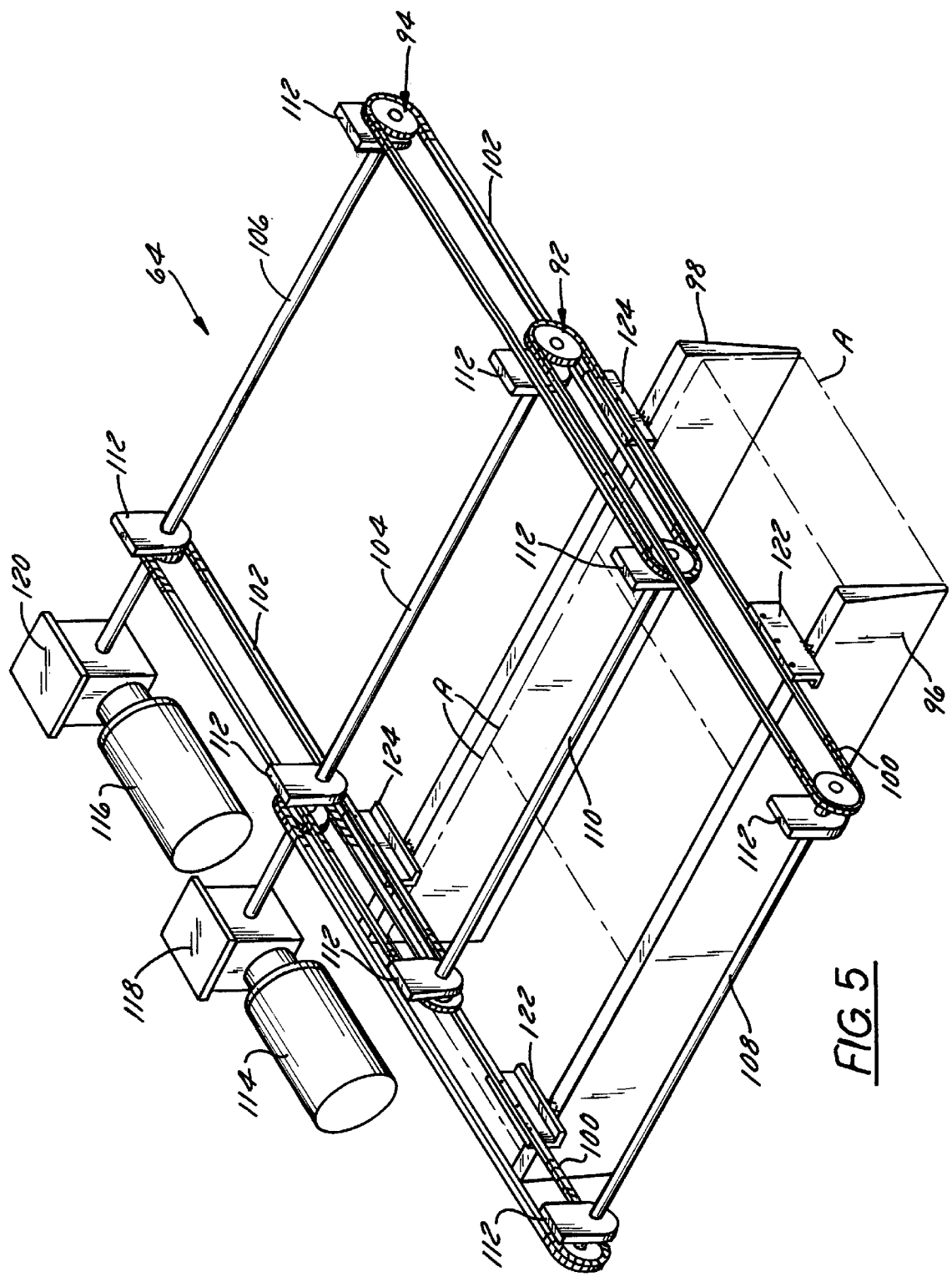
FIG. 5 is a perspective view of an article transfer assembly of the palletizer/depalletizer system of FIGS. 1–4.

Referring now particularly to FIGS. 1 and 5, the article transfer assembly 64 is mounted on an upper portion 90 of the first platform 52 of the frame assembly 36 that overlies the infeed conveyor 60 and the indexing hoist assembly 62. The article transfer assembly 64 preferably comprises first and second drive conveyors 92 and 94 and first and second sweep arms 96 and 98. Each of these subassemblies now will be described in turn.

The first and second drive conveyors 92 and 94 comprise independently operated endless drive conveyors mounted on the upper portion 90 of the first platform 52. Each of the conveyors 92 or 94 comprises a pair of laterally-spaced, parallel endless belts 100 or 102 each driven by a common drive shaft 104 or 106 at one end of the assembly and supported by a common idler shaft 108 or 110 at the opposite end of the assembly. The drive shafts 104, 106 and idler shafts 108, 110 of each conveyor 92 or 94 are journaled in bearings (not shown) located in supports 112 that extend downwardly from the upper portion 90 of the first platform 52. Each of the first and second drive shafts 104, 106 is driven to rotate by a respective reversible electric motor 114, 116 via a respective gear box 118, 120 mounted on the upper portion 90 of the first platform 52.

The sweep arms 96 and 98 are suspended from the associated conveyors 92 and 94 so as to extend in parallel with one another orthogonally to the direction of conveyor movement. Each sweep arm 96 or 98 extends longitudinally beyond the conveyor belts of the associated drive conveyor 92 or 94 through a distance that is at least substantially as long as the number of articles A in a layer to be palletized (three in the illustrated embodiment) and that preferably is essentially the same length as the hoist platform 76. Each sweep arm 96, 98 is mounted on the associated belts 100, 102 by L-brackets 122, 124. Each bracket 122 or 124 has 1) a lower horizontal leg that is welded or otherwise affixed to the upper end of the sweep arm 96 or 98 and 2) an upwardly-extending vertical leg that is connected to the associated conveyor belt 100 or 102 by bolts, rivets, or the like.

A pallet loading or palletizing operation can be understood with reference particularly to FIGS. 6–9. The palletizer 32 is prepared for a palletizing operation by energizing the electric motor 78 to lower the support surface of the hoist platform 76 to a position in which it is capable of receiving a number n of unloaded, stacked pallets P from the SRM 42. The number of pallets in the stack $S_1$ may vary from one to a maximum number n determined by the dimensions of the pallets P and the dimensions and number of layers of articles A to be stacked on the pallets P. It is preferred that the number n be set such that the height of n stacked pallets be approximately equal to the height of a fully-loaded pallet. In the illustrated embodiment in which the palletizer 32 is adapted to handle pallets P of the type detailed in Section 5 below, each pallet P is approximately 3" high. Assuming that the number m of article layers to be loaded on a pallet P is three and that each article has a height of approximately 9", a fully loaded pallet P will have a height of approximately 30". It is therefore preferred that the maximum number n of pallets P to be handled in these conditions is 10 so that the height of the complete stack $S_1$ of pallets (30" for 10 pallets) will equal the height of the fully loaded pallet P (30"). The bottom-most position of the illustrated hoist platform 76 should be spaced at least 60" beneath the staging plane. The ASR access position, i.e., the position at which the SRM 42 accesses a pallet P or stack $S_1$ of pallets, is located about 20" beneath the staging plane.

Figure 6:
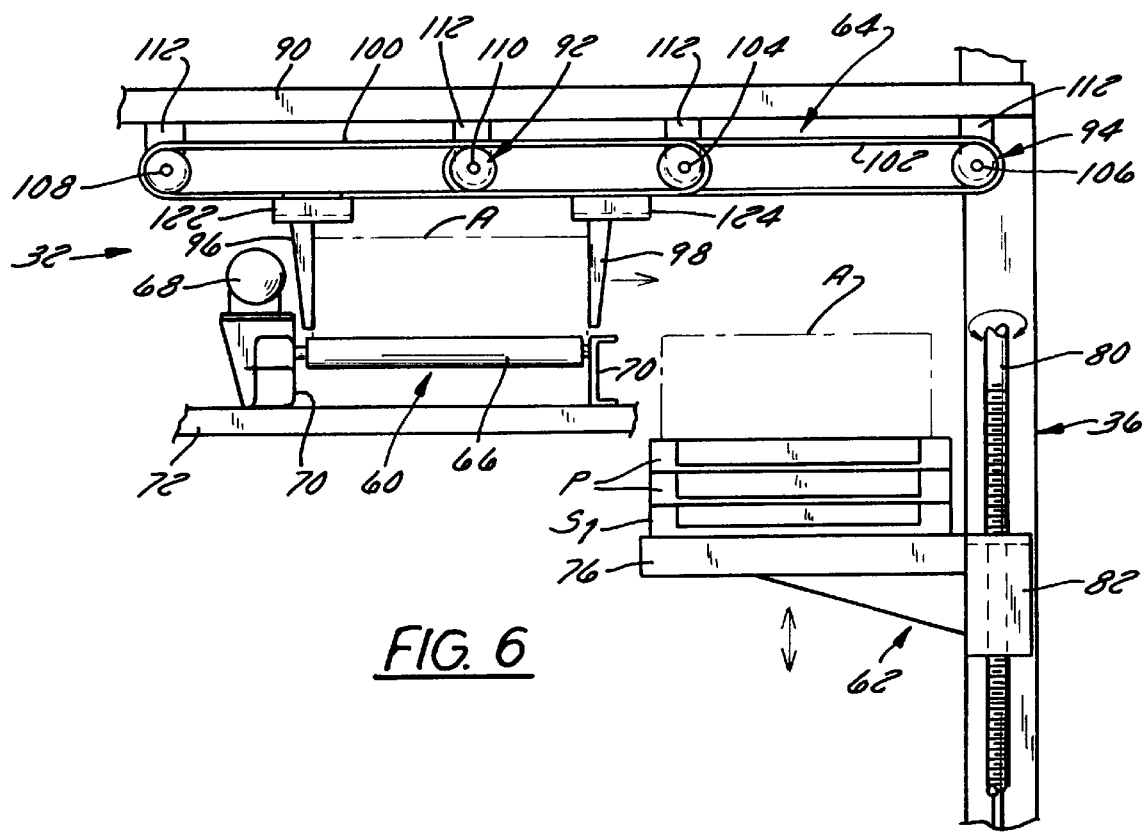
FIGS. 6–9 are partially-schematic, end elevation views of a palletizer of the palletizer/depalletizer system of FIGS. 1–4 and illustrating a sequence of loading a layer of articles onto a partially-loaded pallet.

After the stack $S_1$ of pallets P is positioned on the hoist platform 76, the uppermost and underlying pallets are sequentially loaded and retrieved one at a time until all pallets in the stack have been loaded and removed from the palletizer 32. The palletizer 32 is illustrated in an intermediate state of its operation in FIGS. 6–9 in which the second of three layers of articles A is stacked on a pallet P of a partially depleted stack having three remaining pallets. Specifically, the motor 78 of the indexing hoist assembly 62 is energized to drive the hoist platform 76 upwardly to the position seen in FIG. 6 in which the upper surface of the first layer of articles A is positioned in the staging plane generally coplanar with (or possibly slightly below) the surface of the infeed conveyor 60. A second layer of articles A is conveyed onto the infeed conveyor 60 either prior to, during, or subsequently to this lift procedure so that the second layer is positioned between the first and second sweep arms 96 and 98 as illustrated in FIG. 6. The first sweep arm 96 must be placed in the position illustrated in FIG. 6 prior to conveyance of the second article layer to the staging area. The second sweep arm 98 may be driven to the position illustrated in FIG. 6 either prior to, during, or after conveyance of the second layer to the staging area. The distance between the first and second sweep arms 96 and 98 at this time is preferably slightly greater than the length of the articles of the layer so as not to inhibit article transfer but so as to flank the staged articles A with only a relatively small space therebetween.

Figure 7:
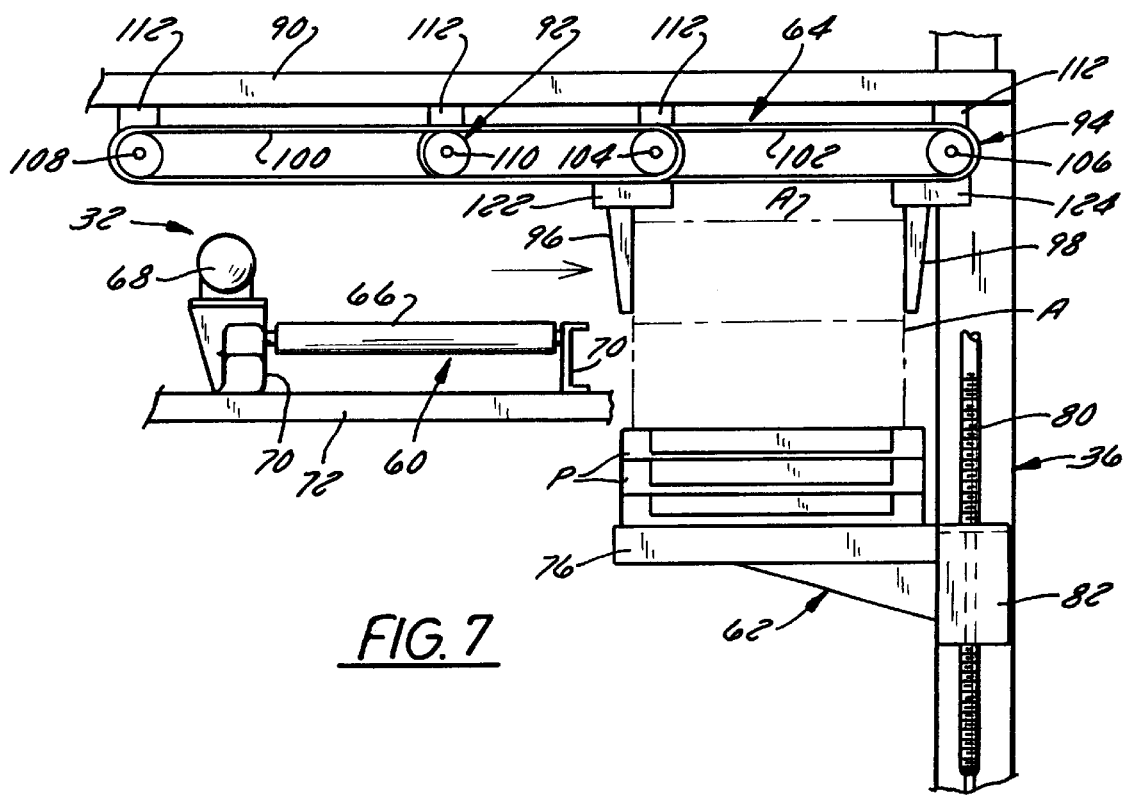

Next, the motors 114 and 116 of the article transfer assembly 64 are energized to simultaneously drive the first and second sweep arms 96 and 98 to the right as represented by the arrow in FIGS. 6 and 7. This sweep arm motion transfers the layer of articles within the staging plane from the staging area to the palletizing zone where it is supported by the underlying first layer of articles. The first sweep arm 96 acts as a pusher during this motion which contacts the articles A, and the second sweep arm 98 acts as a guide which prevents excessive displacement of the articles A of the layer relative to one another and consequent undesired pattern disruption. During this motion, the first sweep arm 96 moves from an initial position located remote from the palletizing zone to a terminal position located adjacent to the palletizing zone, and the second sweep arm 98 moves from an initial position located adjacent the staging area to a terminal position located remote from the staging area.

Figure 8:
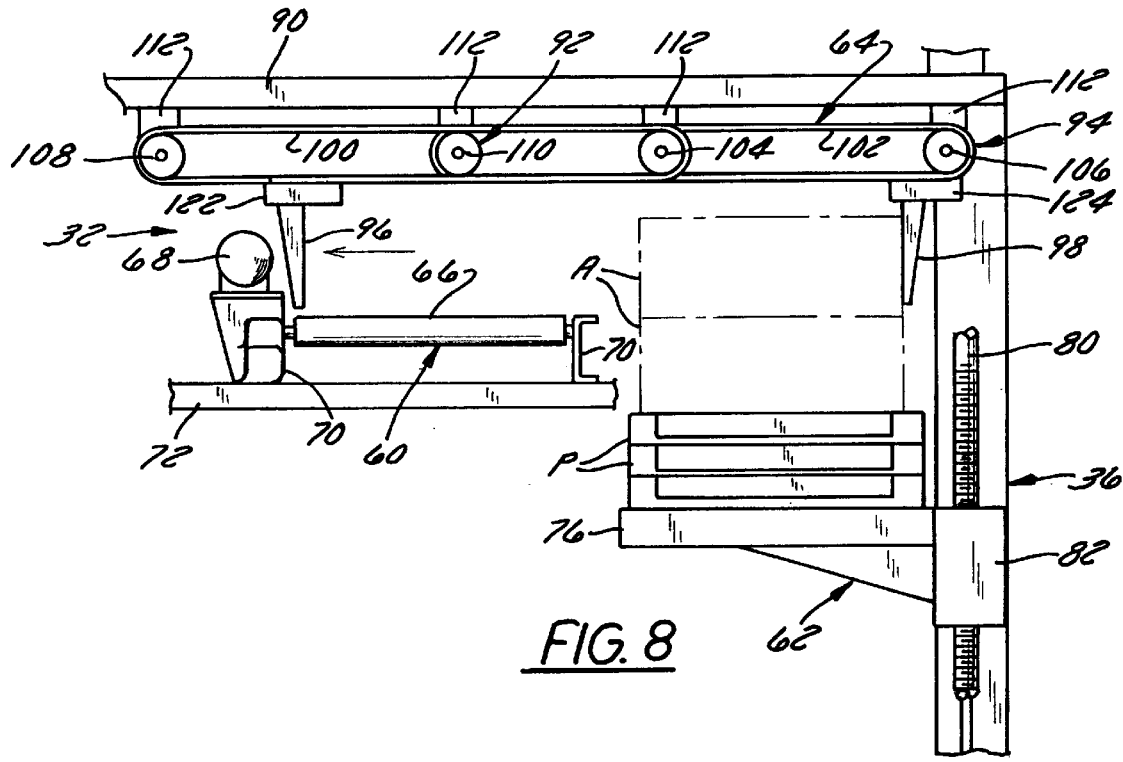
Figure 9:
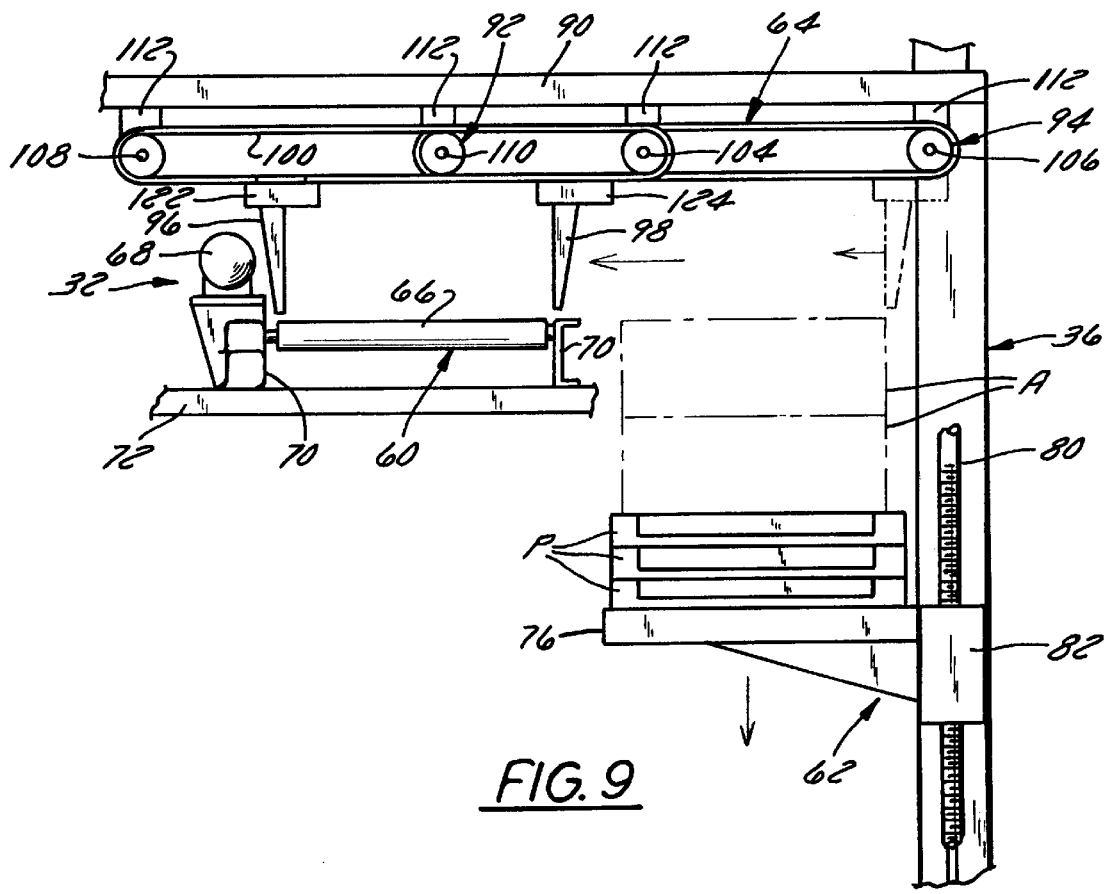

Next, as illustrated in FIGS. 8 and 9, the first sweep arm 96 of the article transfer assembly 64 is returned to its initial position located remote from the palletizing zone, and the hoist platform 76 is lowered or indexed downwardly under the action of the motor 78 so that the upper surface of the second layer of articles is positioned essentially in the staging plane as seen in FIG. 9. The second sweep arm 98 of the article transfer assembly 64 is also returned to its initial position adjacent the staging area as seen in solid lines in FIG. 9. Another layer of articles is conveyed into the staging area under operation of the infeed conveyor 60 prior to, during, or simultaneously with the return of the second sweep arm 98 to its initial position, thereby preparing the palletizer 32 for another article transfer operation.

The process described above in conjunction with FIGS. 6–9 is repeated until the uppermost pallet P is fully loaded, at which point the indexing hoist motor 78 is reversed to lower the hoist platform 76 downwardly to a position in which the uppermost pallet is accessible by the SRM 42. The SRM 42 then removes the loaded, uppermost pallet P from the stack $S_1$ preferably without lifting the pallet (see Section 5 below), and transfers the loaded pallet away from the palletizer/depalletizer system 30. The motor 78 then drives the hoist platform 76 upwardly to a position in which the upper surface of the (n−1)th (now the uppermost pallet) is positioned in the palletizing plane, and the process is repeated for the (n−1)th pallet P.

The process described above is repeated for each of the pallets P of the stack $S_1$ until all pallets of the stack $S_1$ have been loaded and conveyed away from the palletizer 32 by the SRM 42. A new stack of pallets then can be loaded on the hoist platform 76, and the process can be repeated.

A stack of pallets can be loaded very quickly using the above-described process because a separate pallet P need not loaded onto the hoist platform 76 for each palletizing operation and because the individual layers of articles can be loaded onto the pallets without requiring operation of a separate slide plate assembly. A loaded pallet of three layers of three articles each can be loaded in only about 65 seconds. Moreover, because the pallets can be accessed by a conventional SRM, dedicated pallet transport conveyors can be eliminated, thereby reducing the cost and complexity of the system.

4. Construction and Operation of Depalletizer

The depalletizer 34 is structurally and functionally similar to the palletizer 32 except for the fact that its operation is reversed when compared to the operation of the palletizer. That is, the palletizer 32 loads the uppermost pallet of a stack, permits that pallet's removal, and repeats the process until the entire stack has been palletized and removed from the palletizer 32. The depalletizer, on the other hand, unloads a loaded pallet, accepts a loaded pallet on top of the newly-emptied pallet, and repeats the process until a stack of empty pallets is formed on the depalletizer 34. Components of the depalletizer 34 corresponding conceptually to corresponding components of the palletizer 32 therefore are denoted by the same reference numerals, incremented by 100.

The depalletizer 34 includes an outfeed conveyor 160 positioned in a staging area, an indexing hoist assembly 162 that extends through a hoisting or depalletizing zone located adjacent the staging area, and an article transfer assembly 164 that transfers articles in a horizontal staging plane from the depalletizing zone to the staging area. Each of these subassemblies will be described in turn.

The outfeed conveyor 160 is a roller conveyor adapted to convey layers of articles away from the depalletizer 34 and down a discharge chute 171 in the direction of arrow in FIG. 1. Outfeed conveyor 160 includes a plurality of rollers 166 driven by a motor 168 to rotate in the opposite direction of the corresponding rollers 60 of the infeed conveyor 60. The rollers 166 are rotatably mounted on laterally-opposed frames 170 which in turn are supported on a lower portion 172 of the second support platform 54.

The indexing hoist assembly 162 is structurally and functionally identical to the indexing hoist assembly 62 described in Section 3 above. The indexing hoist assembly 162 includes a hoist platform 176 and a screw drive mechanism adapted to raise and lower the hoist platform 176 relative to the frame assembly 36. The screw drive mechanism includes a reversible electric motor 178, a gear box 184, drive shafts 186, and a plurality of threaded rods 180 on which the hoist platform 176 is mounted via threaded sleeves 182.

The article transfer assembly 164 of the depalletizer 34 also is identical to the article transfer assembly 64 of the palletizer 32. Article transfer assembly 164 therefore includes sweep arms 196 and 198 suspended from and driven by respective first and second conveyors 192 and 194 driven by reversible electric motors 214 and 216. The conveyors 192 and 194 are suspended from an upper portion 190 of the second support platform 54 and include 1) respective spaced endless belts 100 and 102, 2) drive shafts 104 and 106, and 3) idler shafts 110 and 112.

In operation, the depalletizer 34 is readied for operation by controlling the motor 178 of the indexing hoist assembly 162 to lower to hoist platform 176 to a location in which a surface thereof is accessible by the SRM 44. This surface may comprise either a upper surface of the hoist platform 176 or a surface of the uppermost pallet P of a stack $S_2$ of pallets supported on the hoist platform 176. The SRM 44 then deposits a loaded pallet on the surface. The loaded pallet supports m layers (m being 3 in the illustrated embodiment) of articles.

Figure 10:
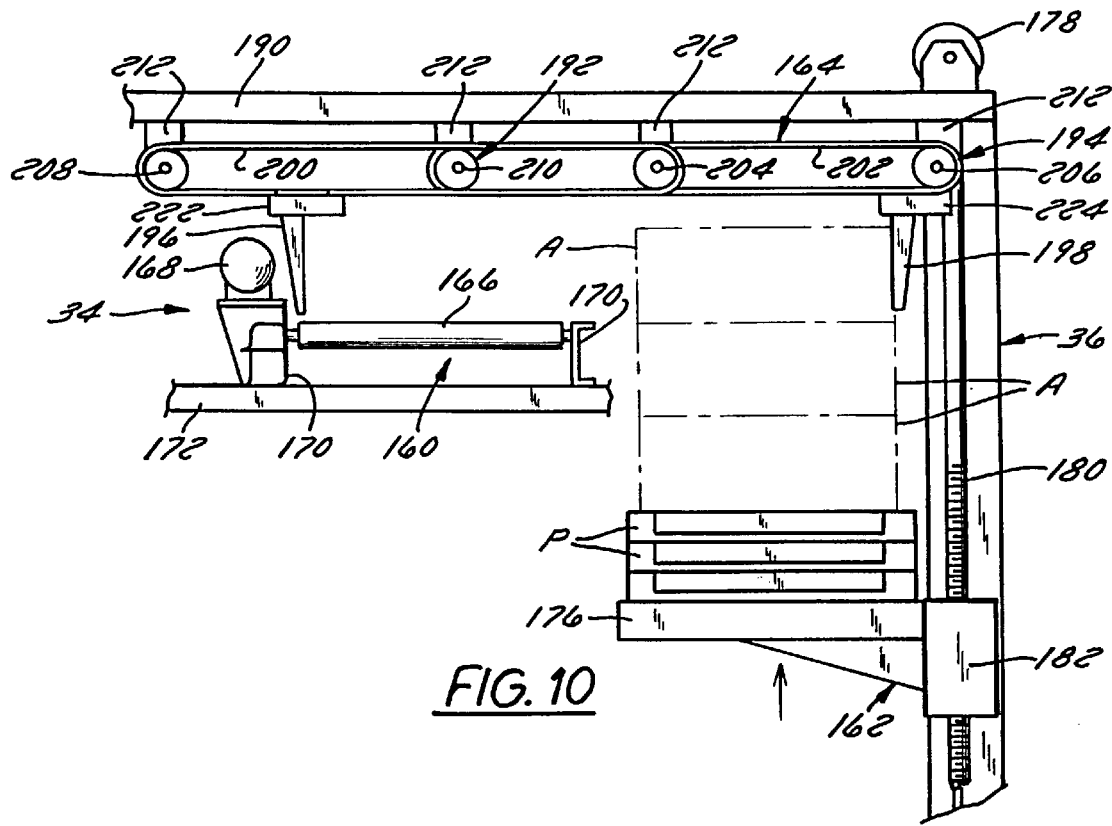
FIGS. 10–13 are partially-schematic, end elevation views of a depalletizer of the palletizer/depalletizer system of FIGS. 1–4 and illustrating a sequence of removing a layer of articles from a loaded pallet.
Figure 11:
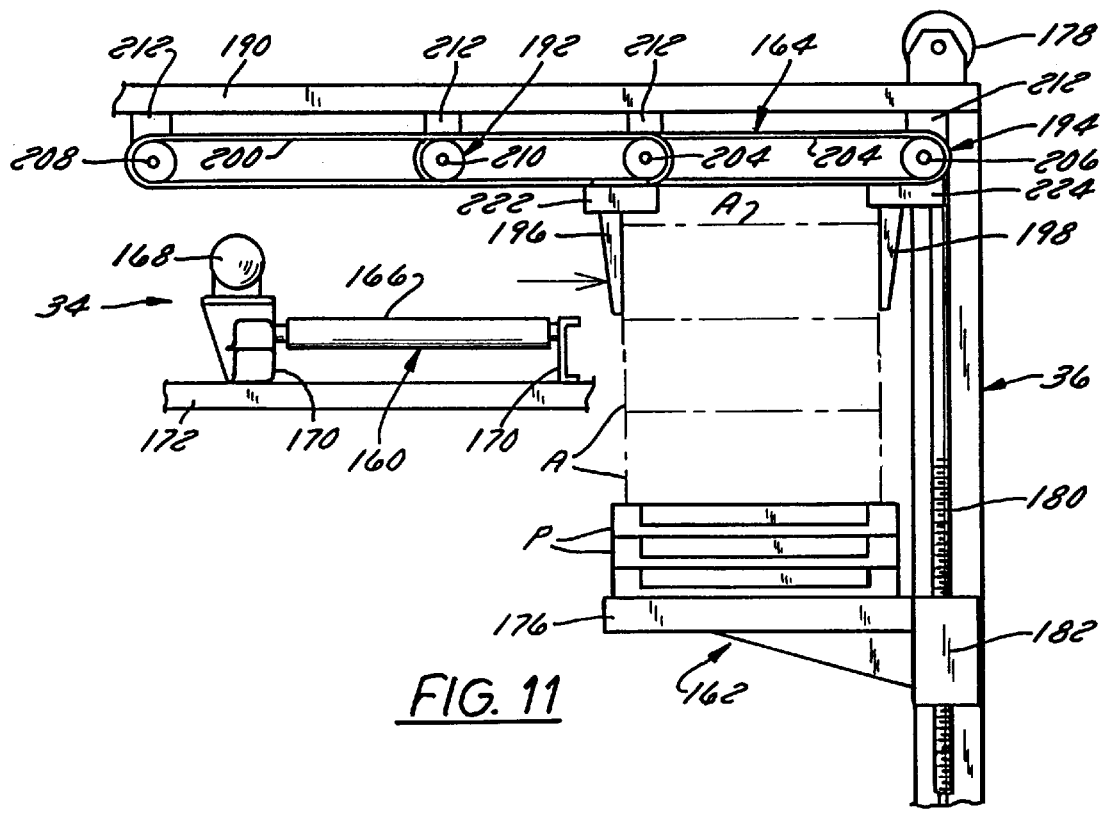

Referring to FIGS. 10–13, depalletizing now begins by energizing the indexing hoist motor 178 to lift the hoist platform 176 to the position illustrated in FIG. 10 in which the bottom surface of the mth layer of articles is located in the staging plane. It is important that the sweep arm 198 of the article transfer assembly 164 be positioned in the initial position illustrated in FIG. 10 prior to this operation so that it is located remote from the staging area and adjacent one end of the article layer. The sweep arm 196 of the assembly 164 is driven from an initial position located remote from the depalletizing zone to its terminal position illustrated in FIG. 11 located adjacent the depalletizing zone and adjacent the opposite end of the article layer. Movement of the sweep arm 196 in this manner may occur either prior to, simultaneously with, or after the upward indexing of the indexing hoist assembly 162. The sweep arms 196 and 198 of the assembly 164 now flank the ends of the articles of the layer with a slight clearance as seen in FIG. 11.

Figure 12:
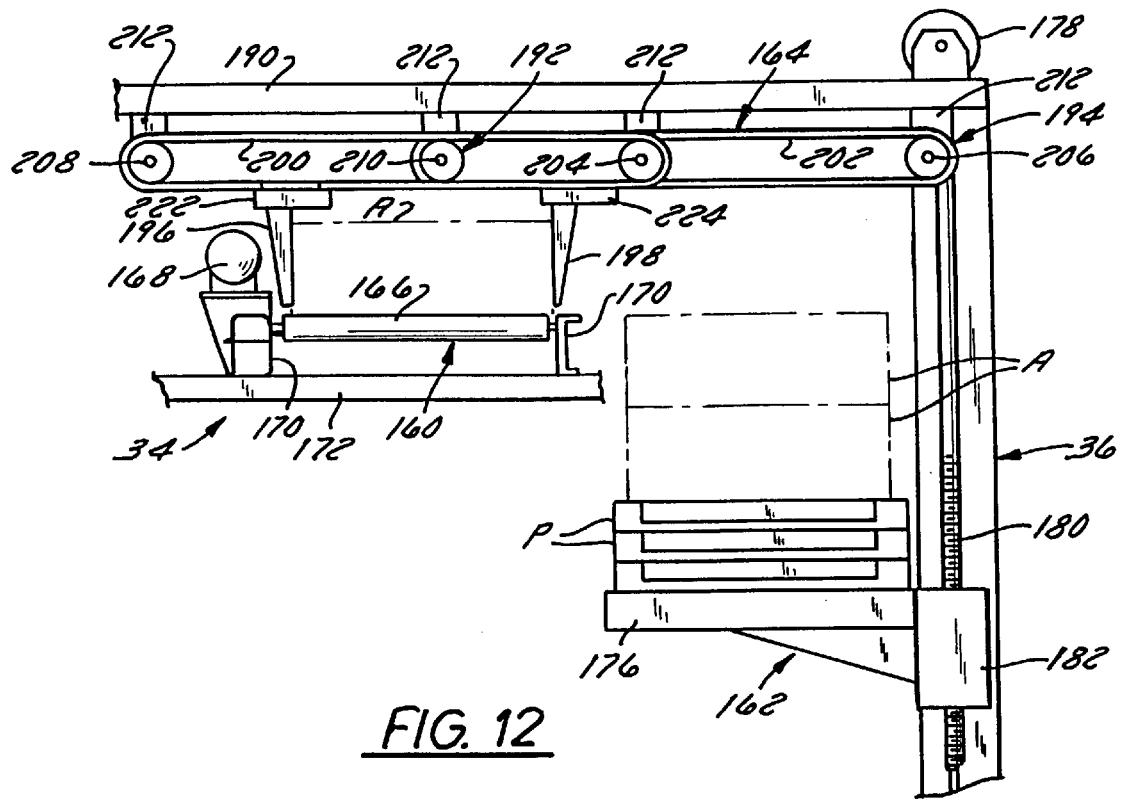
Figure 13:
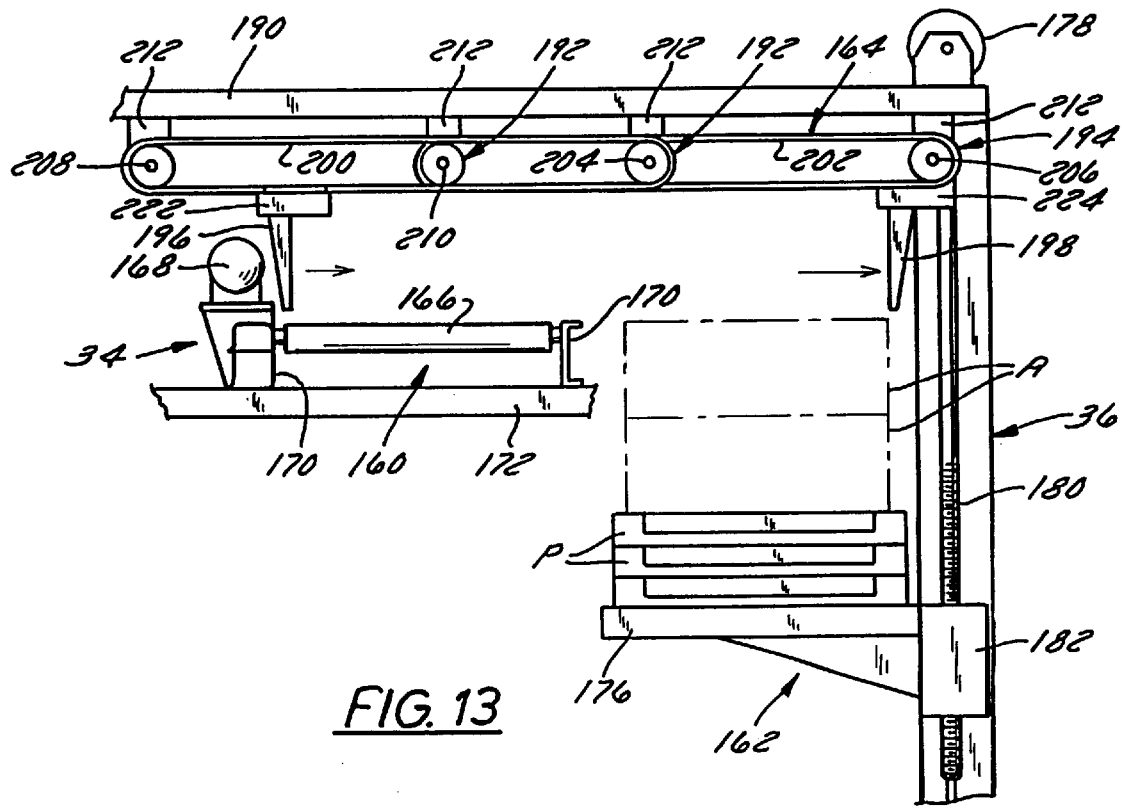
Figure 14:
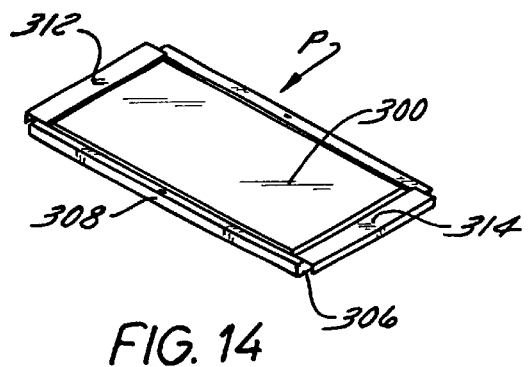
FIG. 14 is a perspective view of a stackable pallet usable in the palletizer/depalletizer system of FIGS. 1–3.

Next, the sweep arms 196 and 198 of the article transfer assembly 164 are driven simultaneously to transfer the mth article layer to the outfeed conveyor 160 so that the sweep arm 196 is located remote from the depalletizing zone and the sweep arm 198 is located adjacent the staging area as illustrated in FIG. 12. The sweep arm 196 acts as a guide and the sweep 198 arm acts as a pusher during this motion. Only after the layer of articles is conveyed away from the depalletizer 34 by the outfeed conveyor 160 can the sweep arm 196 of the assembly 164 be returned to the initial position adjacent the depalletizing zone seen in FIG. 13. The sweep arm 198 of the assembly 164 can be returned to the initial position remote from the staging area as seen in FIG. 13 at any time prior to, during, or after operation of the outfeed conveyor 160. The indexing hoist assembly 162 then is controlled to index the hoist platform 176 upwardly to ready the (m−1)th layer of articles for unloading.

The depalletizing process continues until all of the layers of articles are unloaded or depalletized. At this point, the hoist platform 176 is indexed downwardly to receive another loaded pallet P on top of the recently-unloaded pallet, and the depalletizing process continues until a full stack of n unloaded pallets (n being 10 in the illustrated embodiment) is supported on the hoist platform 176. The entire stack $S_2$ of pallets then is transferred from the indexing hoist assembly using the SRM 44. The stack $S_2$ of pallets P then can be stored and/or conveyed to the palletizer 32 for loading as discussed in Section 3 above. Alternatively, each pallet P could be removed by the SRM 44 after it is unloaded to avoid handling of pallet stacks.

5. Construction of Pallet

The above-described palletizing and depalletizing operations are well-suited for loading and unloading relatively small numbers (on the order of 9–12) of cartons or other articles from a pallet. Wooden or other conventional pallets would suffice for supporting these small loads. However, a preferred pallet is one which is stackable, easily-handled, loadable and unloadable while stacked, and capable of being transferred by an SRM that transfers an article by grasping onto a handle of the article and sliding it horizontally rather than by lifting it. A pallet P particularly well-suited for these purposes is illustrated in FIGS. 14–20.

Figure 21:
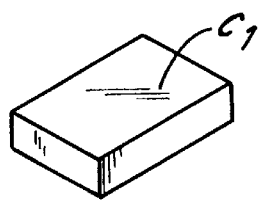
FIGS. 21 and 22 are perspective views of a first carton stackable on the pallet of FIGS. 14–20 and of a correspondingly-loaded pallet, respectively.
Figure 23:
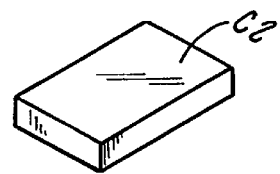
FIGS. 23 and 24 are perspective views of a second carton stackable on the pallet of FIGS. 14–20 and of a correspondingly-loaded pallet, respectively.
Figure 22:
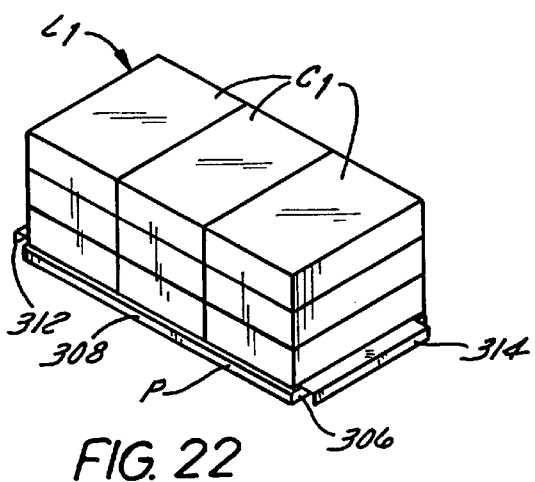
Figure 24:
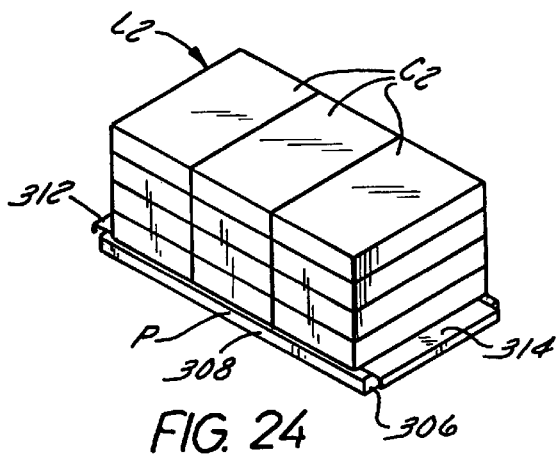
Figure 15:
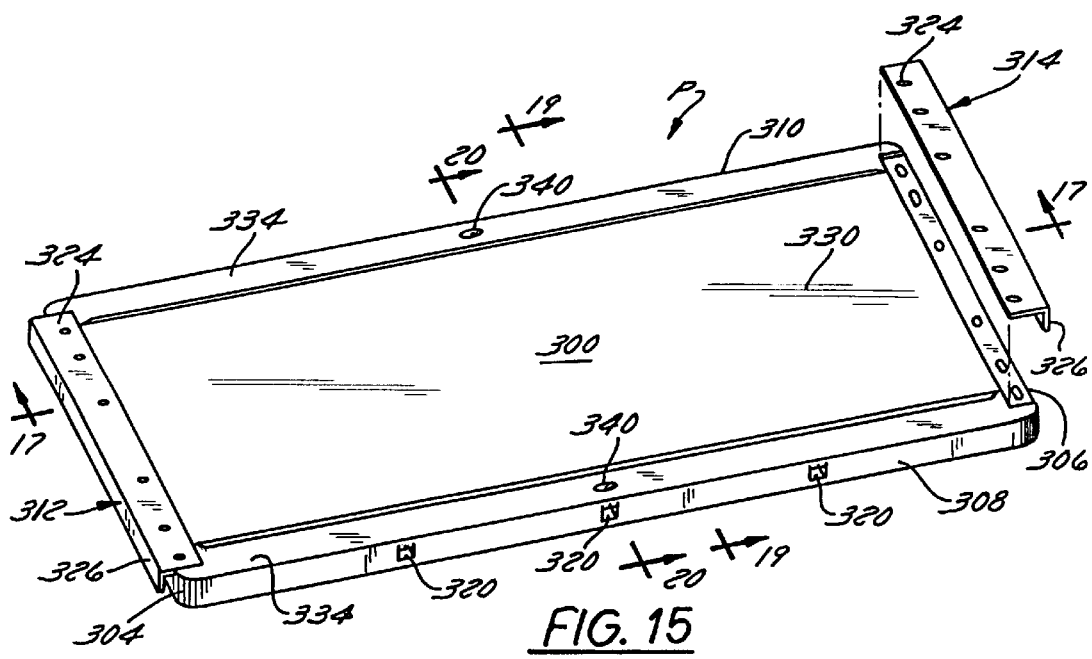
FIG. 15 is a partially-exploded perspective view of the pallet of FIG. 14, viewed from the top of the pallet.
Figure 16:
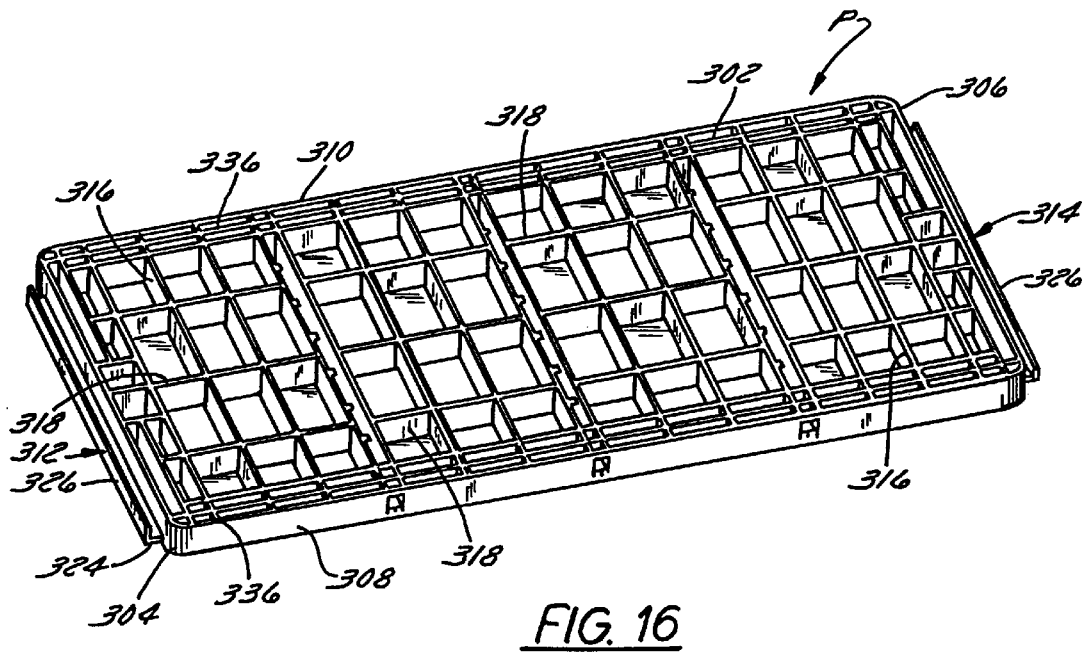
FIG. 16 is a perspective view of the pallet of FIGS. 14 and 15, viewed from the bottom of the pallet.

The pallet P is generally rectangular in shape so as to have an upper surface 300, a lower surface 302, front and rear end surfaces 304 and 306, and left and right side surfaces 308 and 310. The pallet P, which is relatively small when compared to conventional pallets (and hence sometimes is known as a pallette), is about 3" high, 27" wide, 60" long, and weighs about 70 lbs. The pallet P therefore is easily handled manually or by small machines. It is configured to support a weight of about 1,000 lbs and to be handled by an SRM having a capacity of 1200 pounds. It therefore is well-suited for supporting either 1) the article layer configuration $L_1$ illustrated in FIG. 22 and consisting of three layers of three relatively large cartons $A_1$ (see FIG. 21), each carton $A_1$ being approximately 26" long×21" wide×9.5" deep; or 2) the article layer configuration $L_2$ illustrated in FIG. 24 and consisting of four layers of relatively small cartons $A_2$ (see FIG. 23), each carton $A_2$ being approximately 26" long×18" wide×7" deep. In either event, the fully-loaded pallet weighs about 800 lbs to 1,000 lbs. The pallet P should be constructed so as to be strong enough to support this weight, to slide relative to other pallets when loaded, and to be capable of being transported by sliding without lifting by an SRM or other device.

Towards these ends, the pallet P includes a body and at least one and preferably two handles 312 and 314. The body presents the top and bottom surfaces 300 and 302 and the front end, rear end, right side and left side surfaces 304, 306, 308, and 310. The body preferably is formed from a unitary piece of injection-molded plastic so as to present contiguous upper, side, and end surfaces and an open bottom surface. Lateral and longitudinal ribs 316 and 318 are formed integrally with the upper, side, and end surfaces during the injection-molding process. Some of the lateral ribs 316 extend across the width of the pallet P so as to segment the longitudinal ribs 318 and so as to form laterally extending, longitudinally spaced channels for receiving U-shaped reinforcing inserts 320. The inserts 320 preferably are formed from aluminum or another light-weight metal. Somewhat deeper channels are formed at the ends of the pallet P for receiving steel inserts 322 which not only reinforce the pallet P but which also receive the handles 312 and 314.

The handles 312 and 314 extend away from the front and rear end surfaces 304 and 306, respectively. Each handle extends in parallel with the associated front or rear end surface 304 or 306 of the pallet P. Each handle is a generally L-shaped member having a horizontal upper leg 324 and a lower vertical leg 326. The upper leg 324 of each handle is mounted in a recess formed in the corresponding end of the upper surface 300 of the pallet P, is attached to the associated steel insert 322 by carriage bolts 328 which extend through the upper surface of the pallet P as best seen in FIG. 18, and extends longitudinally outwardly away from the associated front or rear surface 304 or 306 of the pallet P. The lower leg 326 of each handle 312 or 314 extends downwardly from the upper leg 324 so as to define a lateral gap between the lower leg 326 and the associated front or rear surface 304 or 306 of the pallet P for access by an SRM which accesses the handle 312 or 314 in essentially the same way that it would access lips of conventional pans or trays. That is, SRM's of this type access lips of trays or pans by rotating a pair of chains to drive laterally-opposed fingers into a location between the lips and the facing surface of the trays. Similarly, a conventional SRM such as the Miniload SRM can access the handle 312 or 314 by rotating chains to position laterally-opposed fingers between the vertical leg 326 of the handle and the associated front or rear surface 304 or 306 of the pallet P.

Upper and lower location surfaces preferably are formed in the upper and lower surfaces 300 and 302 of the pallet P in order to 1) facilitate pallet stacking, 2) permit longitudinal sliding movement of pallets relative to one another when pallets are being stacked or unstacked, e.g., by an SRM, and 3) to inhibit undesired lateral or longitudinal movement of the stacked pallets relative to one another. Towards this end, each pallet P has complimentary ridged and recessed portions 330 and 332 and complimentary lugs and sockets 340 and 342.

The ridged portion 330 and recessed portion 332 facilitate pallet stacking while inhibiting relative lateral movement of stacked pallets. The ridged portion is 330 formed in the upper surface 300 and extends longitudinally across the entire length of the upper surface 300 of the pallet P. Recesses flank this ridge 330 so as to form track portions 334. The recessed portion 332 is formed in the lower surface 302 vertically beneath the ridged portion 332 so as to be flanked by protruding portions forming feet 336 which rest on the track portions 334 when the pallets are stacked as illustrated in FIG. 20. The ridged portion 330 is relatively wide relative to the combined width of the track portions 334 in order to provide a stable article support surface and to minimize the surface area along which sliding friction occurs when the feet 336 slide along the track portions 334 during pallet stacking or unstacking. The ridged portion 330 and corresponding underlying recessed portion 332 each extend across at least 50% of the width of the pallet P and preferably across at least 75% of the width of the pallet P. When the pallets are stacked one on top of the other as seen in FIG. 20, the feet 336 of the overlying pallet P rest on the track portions 334 of the underlying pallet P so as to permit the pallets to slide longitudinally relative to one another under the action of an SRM while precluding side-to-side shifting of the pallets relative to one another.

The lugs 340 and sockets 342 inhibit unintended relative longitudinal motion of stacked pallets. At least one (and one per side in the illustrated embodiment) rounded lug 340 extends upwardly from longitudinally and laterally central portion of each track portion 334. A corresponding lug-receiving socket 342 is formed in each foot 336 vertically beneath the lug 340 so as to rest upon the lug 340 of an underlying pallet when the pallets P are stacked as seen in FIG. 20. As best seen in FIG. 20A, each socket 342 is formed by adjacent lateral ribs 316 which are flanked by elongated longitudinal channels. These channels receive the lugs 340 during pallet stacking or unstacking (after the lugs 340 move past the sockets 342) to permit relative longitudinal movement of the pallets without interference from the lugs 340. The relatively slight retention forces imposed by the mating lugs 340 and sockets 342 is sufficient during normal operation because the longitudinal jarring forces imposed on a stack during handling is relatively small when compared to lateral jarring forces.

Many changes and alterations may be made to the invention without departing from the spirit thereof. The scope of some of these changes are discussed above. The scope of the remaining changes will become apparent from the appended claims.

I claim:

1. A method of palletizing a load, comprising:
   (A) raising a hoist within a palletizing zone to lift a stack of pallets to a position in which an upper surface of an uppermost pallet of the stack is positioned in a staging plane, wherein the uppermost pallet comprises an nth pallet of the stack and is supported on an (n−1)th pallet of the stack, and wherein n is greater than one; then
   (B) depositing a layer of articles on the nth pallet; then
   (C) lowering said hoist to a position in which an upper surface of the layer is positioned in said staging plane; then
   (D) depositing another layer of articles on the layer; then
   (E) repeating said lowering and depositing steps (C) and (D) until the nth pallet is fully loaded with layers of articles; then
   (F) removing the nth pallet from the stack so that the (n−1)th pallet becomes the uppermost pallet of the stack; then
   (G) raising said hoist to a position in which an upper surface of the (n−1)th pallet is positioned essentially in said staging plane; and then
   (H) depositing a layer of articles on the (n−1)th pallet.

2. A method as defined in claim 1, wherein said depositing step (B) comprises pushing the layer of articles essentially horizontally onto said hoist from a staging conveyor located in a staging area positioned adjacent said palletizing zone and having a conveying surface located essentially in said staging plane.

3. A method as defined in claim 2, wherein said pushing step comprises driving a first sweep arm across said staging area in contact with one end of the layer from an initial position located remote from said palletizing zone to a terminal position located adjacent to said palletizing zone while simultaneously guiding movement of an opposite end of the layer using a second sweep arm which moves simultaneously with said first sweep arm from an initial position located adjacent to said staging area to a terminal position located remote from said staging area.

4. A method as defined in claim 3, further comprising returning said first sweep arm to the initial position thereof following said depositing step (B), then
   conveying the another layer into said staging area using said staging conveyor, and
   returning said second sweep arm to the initial position thereof.

5. A method as defined in claim 1, further comprising, prior to said step (F), lowering said hoist to a position in which the nth pallet is accessible by a retrieval mechanism located beneath said staging plane, and then pulling the nth pallet from the stack without lifting the nth pallet.

6. A method as defined in claim 5, further comprising repeating said steps (B) through (F) for each of the remaining pallets of the stack so that no pallets are supported on said hoist, and then transporting another stack of n pallets to said hoist.

7. A method as defined in claim 1, wherein said repeating step (E) is performed only once so that the nth pallet has three layers of articles supported thereon during said removing step (F).

8. A method of depalletizing a load, comprising:
   (A) placing a pallet on a hoist having m layers of articles stacked thereon, wherein m is greater than 2;
   (B) raising said hoist within a depalletizing zone to a position in which an upper surface of an (m−1)th layer of articles is positioned essentially in a staging plane and a bottom surface of an mth layer of articles, stacked on top of the (m−1)th layer, is positioned essentially in said staging plane, wherein the (m−1)th layer is supported on an underlying (m−2)th layer of articles; then
   (C) removing the mth layer from the stack; then
   (D) raising said hoist to a position in which an upper surface of the (m−2)th layer and a bottom surface of the (m−1)th layer are positioned essentially in said staging plane; then
   (E) removing the (m−1)th layer from the (m−2)th layer; then
   (F) repeating said raising and removing steps (C) and (D) until a first layer of articles is removed from the pallet to produce an empty pallet;
   (G) depositing a second, loaded pallet, having at least one layer of articles stacked thereon, onto the empty pallet;
   (H) raising said hoist within the depalletizing zone to a position in which a lower surface of said at least one layer of articles is positioned essentially in said staging plane; and
   (I) removing said at least one layer of articles from the second pallet.

9. A method as defined in claim 8, further comprising, following said step (I),
   (J) performing said steps (B) through (F) on said second, loaded pallet to empty the second, loaded pallet.

10. A method as defined in claim 9, further comprising repeating said step (J) a number (n−2) of times to produce a stack of n empty pallets on said hoist, wherein n is an integer greater than 2, and then removing the stack of n pallets from said hoist.

11. A method as defined in claim 8, wherein said removing step (C) comprises pushing the mth layer of articles generally horizontally from said hoist and onto a staging conveyor located in a staging area positioned adjacent said depalletizing zone and having a conveying surface located essentially in said staging plane.

12. A method as defined in claim 11, wherein said pushing step comprises driving a first sweep arm across said depalletizing zone in contact with one end of the mth layer from an initial position located remote from said staging area to a terminal position located adjacent to said staging area while simultaneously guiding movement of an opposite end of the mth layer using a second sweep arm which moves simultaneously with said first sweep arm from an initial position located adjacent to said depalletizing zone to a terminal position located remote from said depalletizing zone.

13. A method as defined in claim 12, further comprising conveying the mth layer from said staging area using said staging conveyor, then
   returning said first sweep arm to the initial position thereof prior to said raising step (D), and
   returning said second sweep arm back to the initial position thereof.

14. An article handling system comprising:
   (A) an article conveyor at least a portion of which is located in a staging area and has a conveying surface located essentially in a staging plane;
   (B) a hoist moveable vertically in a hoisting zone located adjacent said staging area; and
   (C) an article transfer assembly located over said article conveyor and said hoist and operable to push articles within said staging plane from one of said article conveyor and said hoist to the other of said article conveyor and said hoist, wherein said article transfer assembly includes a frame located above said article conveyor and said hoist;

first and second parallel, independently operated endless drive conveyors mounted on said frame, wherein each of said drive conveyors includes a pair of spaced belts driven by a common drive shaft; and first and second parallel sweep arms, each of which is suspended from a respective drive conveyor and which extends orthogonally to a direction of drive conveyor movement.

15. An article handling assembly comprising;

a first article handling system mounted onto a frame and including an article conveyor at least a portion of which is located in a staging area and has a conveying surface located essentially in an article transfer plane;

a hoist moveable vertically in a hoisting zone located adjacent said staging area; and an article transfer assembly located over said article conveyor and said hoist and operable to push articles within said article transfer plane from one of said article conveyor and said hoist to the other of said article conveyor and said hoist; and a second article handling system mounted on said frame assembly above said first article handling system and including a second article conveyor at least a portion of which is located in a second staging area and has a conveying surface located essentially in a second article transfer plane;

a second hoist moveable vertically in a second hoisting zone located adjacent said second staging area; and a second article transfer assembly located over said second article conveyor and said second hoist and operable to push articles within said second article transfer plane from one of said second article conveyor and said second hoist to the other of said second article conveyor and said second hoist.

16. An article handling assembly as defined in claim 15, wherein said first article handling system comprises a palletizing system and said first article conveyor comprises an infeed conveyor which feeds articles into said first staging area, and wherein said second article handling system comprises a depalletizing system and said second article conveyor comprises a takeoff conveyor which conveys articles away from said second staging area.

17. A palletizer comprising:

(A) an article conveyor at least a portion of which is located in a staging area and has a conveying surface located essentially in a staging plane;

(B) a hoist, wherein said hoist is moveable vertically in a hoisting zone located adjacent said staging area;

(C) an article transfer assembly located over said article conveyor and said hoist; and (D) means for:

1. raising said hoist to lift a stack of empty pallets to a position in which an upper surface of an uppermost pallet of the stack is positioned at least essentially in said staging plane, wherein the uppermost pallet comprises an nth pallet of the stack of empty pallets and is supported on an (n−1)th pallet, 2. controlling said article transfer assembly to deposit articles on the nth pallet, then 3. lowering said hoist and permitting the nth pallet and the articles on the $n^{th}$ pallet to be removed from the stack so that the empty (n−1)th pallet becomes the uppermost pallet of a stack of (n−1) empty pallets, then 4. after removal of the nth pallet from the stack, raising said hoist to lift the stack of (n−1) empty pallets to a position in which an upper surface of the empty (n−1)th pallet is positioned at least essentially in said staging plane, and then 5. controlling said article transfer assembly to deposit articles on the (n−1th) pallet.

18. A depalletizer comprising:

(A) an article conveyor at least a portion of which is located in a staging area and has a conveying surface located essentially in a staging plane;

(B) a hoist, wherein said hoist is moveable vertically in a hoisting zone located adjacent said staging area;

(C) an article transfer assembly located over said article conveyor and said hoist; and (D) means for:

1. raising said hoist to lift a stack of pallets to a position in which an upper surface of an uppermost pallet of the stack is positioned at least essentially in said staging plane, wherein the uppermost pallet comprises an nth pallet of the stack and has articles supported thereon, and wherein the remaining pallets of said stacks are empty, 2. controlling said article transfer assembly to remove articles from the nth pallet, thereby to unload the nth pallet and to leave a stack of n empty pallets, then 3. lowering said hoist to a position in which the upper surface of the nth pallet is beneath the staging plane and permitting a loaded (n+1)th pallet to be stacked on top of the empty nth pallet so that the (n+1)th pallet becomes the uppermost pallet of the stack, then 4. after the loaded (n+1)th pallet is stacked on top of the empty nth pallet, raising said hoist to a position in which an upper surface of the (n+1)th pallet is positioned at least essentially in the staging plane, and then 5. controlling said article transfer assembly to remove articles from the (n+1)th pallet.

* * * * *